Oct. 19, 1954 A. J. HINTZE 2,691,939
APPARATUS FOR PLANTING AN EXPLOSIVE CHARGE BELOW THE
SURFACE OF THE EARTH BENEATH A BODY OF WATER
Filed Sept. 12, 1949

INVENTOR.
A. J. HINTZE
BY Hudson & Young
by: L. Malcolm Oberlin
ATTORNEYS

Patented Oct. 19, 1954

2,691,939

UNITED STATES PATENT OFFICE 2,691,939

APPARATUS FOR PLANTING AN EXPLOSIVE CHARGE BELOW THE SURFACE OF THE EARTH BENEATH A BODY OF WATER

Alma J. Hintze, Bartlesville, Okla., assignor to Phillips Petroleum Company, a corporation of Delaware Application September 12, 1949, Serial No. 115,288

6 Claims. (Cl. 102—23)

This invention relates to a method of and apparatus for planting an explosive charge below the surface of the earth beneath a body of water.

Heretofore, in geophysical prospecting of underwater strata, seismic waves have been produced by detonating an explosive charge below the surface of a body of water but above the earth or, alternatively, by detonating such charge at the floor of the earth formation below the water. Difficulties have been experienced in producing seismic waves by this method in that gas bubbles are produced which, as they rise to the surface, cause spurious seismic waves which are incident upon the seismometers of the geophysical prospecting unit, and cause interference with the seismic waves produced by the explosion itself. In accordance with the present invention, the charge of explosive material is buried in the earth beneath the body of water and it has been found that the bottom is not ruptured when the charge is exploded with the result that undesirable gas bubbles are not produced. In addition, the detonation of such a charge is considerably more efficient in producing seismic waves than is the detonation of a charge suspended in the water or at the surface of the earth formation.

It is an object of my invention to provide an improved method of and apparatus for producing seismic waves in underwater formations.

It is a further object to provide apparatus for burying a small charge of explosive material beneath the surface of the earth below a body of water, detonation of such a charge producing seismic waves in an efficient manner.

It is a still further object to provide apparatus which is simple in construction, rugged, and reliable in operation.

Figure 1:
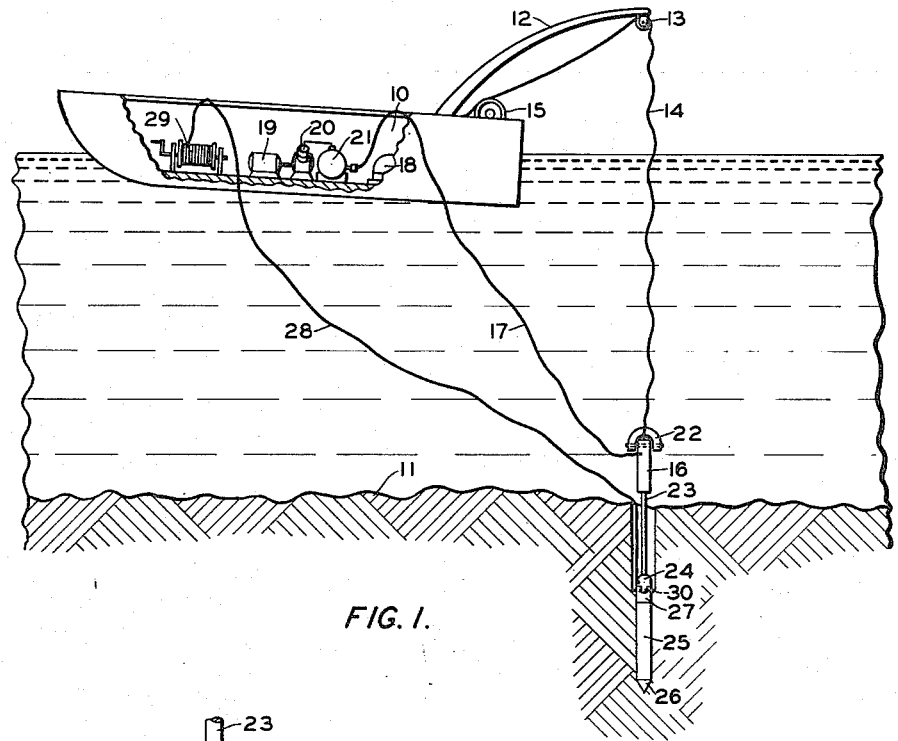
Figure 2:
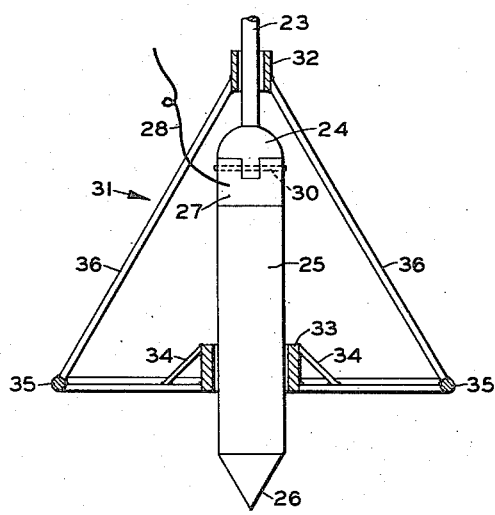

Various other objects, advantages and features of the invention will become apparent from the following description, taken in conjunction with the accompanying drawings, in which:

Figure 1 is a vertical sectional view, partially in elevation, showing the apparatus of the present invention; and Figure 2 is an enlarged vertical sectional view of a capsule containing explosive material with a supporting frame structure therefor.

Referring now to the drawings in detail, and particularly to Figure 1, the planting apparatus is operated from a boat 10 which is shown floating upon a body of water above an earth formation 11. The boat is provided with a boom 12 having a pulley 13 at its outer end, over which passes a cable 14 which may be paid out from a winch 15. The cable 14 supports a hammer assembly 16 which, in a preferred embodiment of the invention, is a conventional air hammer suitably sealed to permit operation thereof beneath the surface of the water. Air or other driving fluid is supplied to the hammer by a hose 17 which is paid out from a winch 18, this hose being attached to a unit for supplying gas under pressure which includes a motor 19, a compressor 20, and a storage tank 21. The hammer 16 is supported by a yoke 22 in a vertical position beneath the surface of the water and it is provided with an elongated driving rod 23 which terminates at a male socket or coupling portion 24. An elongated capsule 25 having a pointed nose 26 is provided with a female socket portion 27 which is complementary to socket portion 24. The capsule 25 contains a charge of explosive material, such as dynamite, which produces seismic waves upon detonation below the surface of the earth. The explosive charge within capsule 25 may be detonated, in a conventional manner, by supplying electrical current thereto through a firing line 28 which is paid out by a winch 29.

In accordance with the invention, the socket or coupling portions 24, 27 are connected together by a shear pin 30. This pin is of sufficient strength to hold the capsule and driving rod together as they are lowered to a position just above the earth beneath the body of water. Ordinarily, the assembly descends with sufficient force that the pointed end 26 of the capsule is forced into the earth a distance of one or two feet by the force of the dropping action. Thereupon, operation of the hammer 16 is initiated by supplying driving fluid thereto through hose 17. The shear pin 30 is not of sufficient strength to withstand the first upward movement of the driving rod 23 and, accordingly, this pin breaks at the first upward stroke of the hammer with the result that socket or coupling portion 24 is detached from socket portion 27. Thereafter, the reciprocatory movement of the hammer produces blows upon the upper end of the capsule which rapidly drive it into the earth below the body of water. When the capsule has been driven a sufficient distance, for example 10 feet into the earth, operation of the hammer is stopped, and the hammer assembly is lifted out of the water by winch 15. Thereupon, electrical current is supplied to the capsule through line 28 to detonate the explosive charge therein and produce seismic waves which are picked up by seismometers, not shown, in the usual manner.

In Figure 2, I have shown a frame assembly 31 for maintaining the capsule and driving rod in a vertical position as the capsule is driven into the earth. This assembly includes a sleeve 32 encircling driving rod 23, and a sleeve 33 of larger diameter than sleeve 32 and vertically aligned therewith, the sleeve 33 encircling capsule 25. The sleeves are interconnected to form a rigid assembly by radially extending rods 34 secured to a loop 35, which is connected to sleeve 32 by inclined rods 36. It will be apparent that the frame assembly 31 holds the capsule and driving rod 23 in a vertical position as the capsule is driven into the earth and that the frame assembly is removed with the driving rod 23 as the hammer assembly is lifted after the capsule has been driven into the earth. This results from the fact that socket or coupling portion 24 is of larger size than sleeve 32.

Tests conducted with the apparatus of this invention show that the capsule 25 may be readily driven into the earth a distance of 10 feet within a period of one minute. When driven to this depth, no gas bubbles were produced, and no discoloration of the water occurred subsequent to the explosion. This indicated that the bottom was not ruptured by the force of the explosion. Detonation of a five pound charge of explosive material in accordance with this invention is as effective in producing seismic waves as detonation of a thirty-five pound charge four feet below the surface of the water. Accordingly, with the apparatus of the present invention, a substantially smaller charge may be used and no spurious seismic waves are produced, as a result of bubbles rising through the water subsequent to the explosion.

While the invention has been described in connection with a present, preferred embodiment thereof, it is to be understood that this description is illustrative only and is not intended to limit the invention, the scope of which is defined by the appended claims.

Having described my invention, I claim:

1. Apparatus for planting an explosive charge in the earth below a body of water which comprises, in combination, an elongated capsule containing a charge of explosive material, suspended flexible cable means and a yoke suspended at the lower end of said cable means for positioning said capsule directly above the earth under a body of water, a reciprocable hammer pivotally attached to said yoke, readily breakable means connecting said hammer and said capsule as they are lowered into a body of water.

2. Apparatus for planting an explosive charge in the earth below a body of water which comprises, in combination, an elongated capsule containing a charge of explosive material, suspended flexible cable means and a yoke suspended at the lower end of said cable means for positioning said capsule directly above the earth under a body of water, a reciprocable hammer pivotally attached to said yoke having a protruding drive rod, socket means on said rod and said capsule, and a shear pin forming a part of said socket means, said shear pin connecting said driving rod and said capsule as they are lowered into the water, and said shear pin being adapted to break during the initial upward stroke of said hammer to break the connection between said rod and said capsule, whereby the hammer is then effective to drive the capsule into the earth beneath said body of water.

3. Apparatus for planting an explosive charge in the earth below a body of water which comprises, in combination, an elongated capsule containing a charge of explosive material, a frame assembly adapted to lie in a flat position upon the earth beneath said body of water, said frame having a pair of vertically aligned sleeves to position said capsule vertically directly above the earth and beneath said body of water and beneath a reciprocable hammer as described in this claim, a reciprocable hammer having a protruding drive rod, coupling means on said rod and said capsule, a shear pin, said shear pin connecting by insertion into said coupling means said driving rod and said capsule as they are lowered into the water, and said shear pin being adapted to break during the initial upward stroke of said hammer to break the connection between said rod and said capsule, whereby the hammer is then effective to drive the capsule into the earth beneath said body of water.

4. Apparatus for planting an explosive charge in the earth below a body of water which comprises, in combination, a boat adapted to float on the surface of said body of water, a boom on said boat for lowering a cable into the water, a hammer assembly pivotally suspended by a yoke attached to the lower end of said cable in the water, said assembly having a driving rod which is positioned vertically when the hammer is lowered into the water, an elongated capsule containing a charge of explosive material, socket means on said driving rod and said capsule, and means readily disengageable upon the upward movement of said driving rod connecting said driving rod and said capsule together as the assembly is lowered into the water.

5. Apparatus for planting an explosive charge in the earth below a body of water which comprises, in combination, a boat adapted to float on the surface of said body of water, a boom on said boat for lowering a cable into the water, a hammer assembly suspended by said cable in the water, said hammer having a reciprocable rod protruding therefrom which is positioned vertically as the hammer assembly is lowered into the water, an elongated capsule containing a charge of explosive material, interfitting socket means on said driving rod and said capsule, a shear pin connecting said rod and said capsule in the region of said socket means, said shear pin being of such strength that it is readily broken during the initial upward movement of said driving rod, and a line extending to said capsule for effecting detonation of the explosive charge therein.

6. Apparatus for planting an explosive charge in the earth below a body of water which comprises, in combination, a boat adapted to float on the surface of said body of water, a boom on said boat for lowering a cable into the water, a pneumatic hammer assembly suspended by said cable in the water, said pneumatic hammer having a reciprocable rod protruding therefrom which is positioned vertically as the pneumatic assembly is lowered into the water, an elongated capsule containing a charge of explosive material, interfitting socket means on said driving rod and said capsule, a shear pin connecting said rod and said capsule at the region of said socket means, said shear pin being of such strength that it is readily broken during the initial upward movement of said driving rod, a frame assembly for holding said capsule in a vertical position as it is driven into the earth beneath a body of water, said frame assembly comprising a sleeve encircling said driving rod, and a second sleeve in vertical alignment with said first sleeve, said second sleeve encircling said capsule, whereby the frame assembly is withdrawn with the hammer after said shear pin is broken, an air line for supplying fluid to effect reciprocatory movement of said hammer, and a line for supplying electric current to said capsule, thereby to effect detonation of the explosive charge therein.

References Cited in the file of this patent

UNITED STATES PATENTS

| Number | Name | Date |
|---|---|---|
| 8,776 | Maillefert | Mar. 2, 1852 |
| 26,073 | Whipple | Nov. 8, 1859 |
| 306,430 | Rightor | Oct. 14, 1884 |
| 1,560,038 | Camp | Nov. 3, 1925 |
| 2,507,230 | Stinnett | May 9, 1950 |
| 2,583,965 | Page, Jr. et al. | Jan. 29, 1952 |

FOREIGN PATENTS

| Number | Country | Date |
|---|---|---|
| 30,242 | Germany | Feb. 3, 1885 |
| 325,213 | Germany | Sept. 10, 1920 |